Oct. 28, 1969     J. E. MESKO     3,475,041
PIPE JOINT HAVING PRESSURE BALANCING MEANS
Filed Dec. 1, 1967
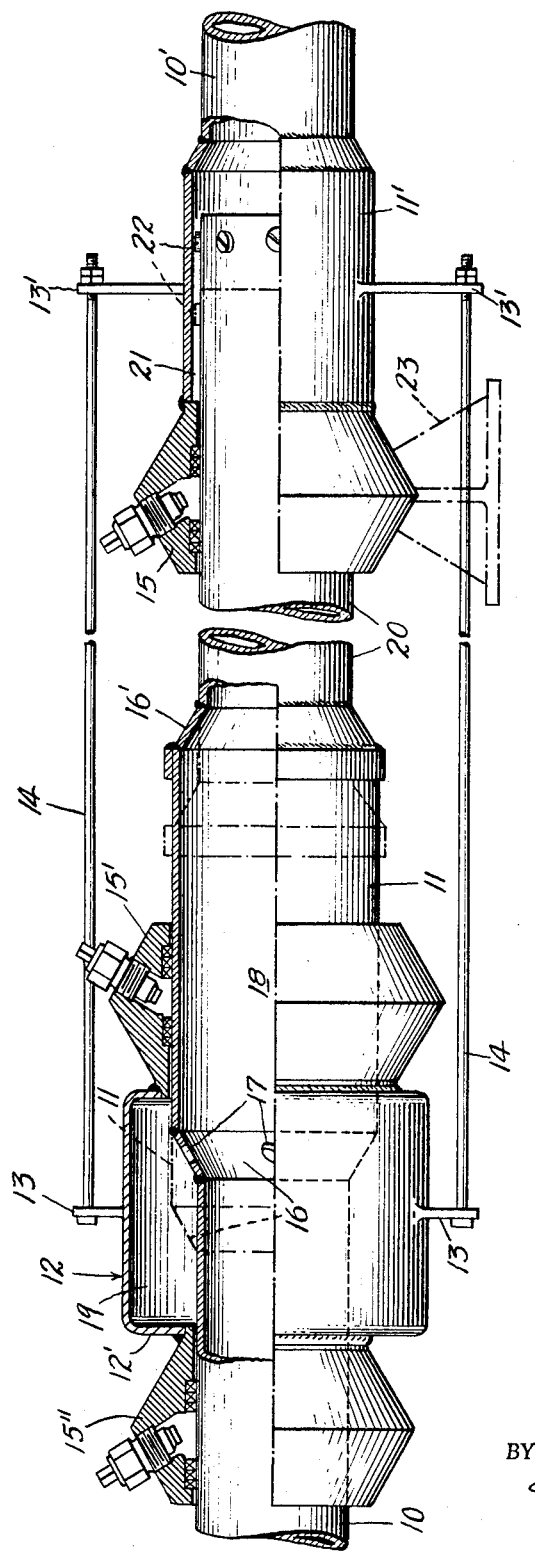
INVENTOR.
JOHN E. MESKO
BY
Howard E. Thompson
ATTORNEY

United States Patent Office 3,475,041
Patented Oct. 28, 1969

3,475,041
PIPE JOINT HAVING PRESSURE
BALANCING MEANS
John E. Mesko, 139—15 83rd Ave.,
Jamaica, N.Y. 11435
Filed Dec. 1, 1967, Ser. No. 687,355
Int. Cl. F16l 33/16, 27/12, 39/04
U.S. Cl. 285—95                              4 Claims

ABSTRACT OF THE DISCLOSURE

A slip-type expansion joint having pressure balancing means fixed with respect to a first line of service pipe and movable relatively to a second line of said service pipe and, wherein, said second line of pipe includes a sleeve slidable in an enlarged expansion chamber section end of the first line of pipe.

BACKGROUND OF THE INVENTION (1) The invention deals with an expansion joint structure, wherein the pressure balancing means comprises a chamber arranged upon the second line of pipe, including an enlarged expansion chamber section thereof, with means employed for placing the bore of the second line of pipe, including the enlarged section thereof, in communication with said chamber.

(2) To applicant's knowledge, he is not aware of any patented device or method for balancing pressure thrust of expansion joints of the type and kind under consideration.

SUMMARY OF THE INVENTION

The invention further deals with the provision of glands for sealing sliding engagement of the two pipe lines one with respect to the other and of the second pipe line, including its enlarged section, with respect to the pressure balancing chamber employed.

The novel features of the invention will be best understood from the following description, when taken together with the accompanying drawing, in which certain embodiments of the invention are disclosed and, in which, the separate parts are designated by suitable reference characters.

The drawing is a diagrammatic side elevation and sectional view, with parts of the construction broken away and parts shown in elevation and further indicating in dot-dash lines movement of the pipe lines one with respect to the other.

In the drawing, I have illustrated one adaptation of the invention. The pipe system, for which the expansion joint is employed, has pipe lines 10, 10' alined for coupling by the joint. At 11, 11' are shown enlarged sections on the lines 10, 10', respectively. At 12 is shown a pressure balancing chamber overlying the pipe line 10 and part of 11.

Sections 12, 11' have a plurality of circumferentially spaced lugs or brackets 13, 13', two only of which are shown. Fixed to the lugs 13, 13' are coupling rods 14 for retaining chamber 12 and section 11' of the pipe line 10' in fixed relationship one with respect to the other.

Welded to the section 11' is a standard packing gland assembly 15 and mounted on section 11 and pipe line 10 are similar glands 15', 15''. Both glands 15, 15'' are welded to the chamber 12, as diagrammatically seen.

Section 11 joins pipe line 10 in a bevelled wall 16, having spaced apertures 17, placing the bore or expansion chamber 18 of 11 in communication with the interior of or bore 19 of chamber 12. Projecting from the section 11 and joining 11 in a bevelled wall 16' is an extension sleeve 20, which operates in the gland 15 and terminates in the bore or expansion chamber 21 of the section 11'. At the free end of the sleeve 20 are a plurality of limit stops 22, limiting expansion movement of the sleeve 20 in the enlarged section 11' of the pipe line 10'.

In some instances, the glands may have integral supporting brackets, as known in the art, and one of such brackets on the gland 15 is diagrammatically outlined in dot-dash lines at 23. No detailed description of the glands is made, as these glands are well-known in the art.

With my improved device and method, it will be apparent that the pressure thrust is taken up by the provision of the balancing chamber, keeping in mind that pressure force is applied to the wall 12' of the chamber 12, as well as the wall 16 of the expansion chamber 18 and that all pressure forces are transferred to the service pipe line defined by the pipe lines 10, 10', thus eliminating any pressure thrust on any anchor which may be employed, such as the bracket indicated in dot-dash lines, as at 23, or any other similar brackets that may be employed. The chamber 12 is considerably larger in diameter than the diameter of the enlarged sections of the two pipes 10, 10' and it will be apparent that, in the above described operation, the rods 14 retain the chamber 12 and the section 11' in fixed relationship one with respect to the other. In the drawing, a partial expansion of the system is indicated in the dot-dash position of 20, 22 and 11 and 16. The limit stops or screws 22 operate to check the relative movement of the parts of the joint to, at all times, keep the free end of the sleeve 20 within the expansion chamber 21.

Having fully described my invention, what I claim as new and desire to secure by Letters Patent is:

1. A device for balancing pressure thrust of a slip-type expansion joint, wherein said joint unites spaced pipes of a service pipeline, a first pipe having an enlarged diameter end section terminating in a packing gland, and a second pipe having a first diameter section, an enlarged intermediate diameter section and terminating in a reduced diameter extension sleeve slidably operating in said packing gland and first named section, said second pipe having a substantially constant wall thickness, said device comprising a pressure balancing tubular chamber having a diameter larger than the diameter of said enlarged section of the second pipe, said pressure balancing tubular chamber having radially extending end walls and supporting at one end a packing gland slidably engaging the outer surface of said first diameter section of said second pipe and at the other end a packing gland slidably engaging the outer surface of the enlarged section of said second pipe, means fixedly coupling said pressure balancing tubular chamber to the enlarged section of said first pipe and spacing the same therefrom to overlie the juncture between said first diameter section and the enlarged diameter intermediate section thereof, and port means at said juncture establishing communication between the interior of said enlarged section of said second pipe and the interior of said pressure balancing tubular chamber.

2. A device as defined in claim 1, wherein said port means comprises circumferentially spaced apertures in a bevelled wall joining said first diameter section with the enlarged section diameter intermediate thereof.

3. A device as defined in claim 1, wherein said pressure balancing tubular chamber and the enlarged diameter section of said first pipe are of similar length accommodating substantial axial movement respectively therein of the juncture of said second pipe and the enlarged section thereof and of the end of said extension sleeve.

4. A device as defined in claim 1, wherein said first named means comprises circumferentially spaced coupling rods fixedly coupled with circumferentially spaced lugs on said pressure balancing tubular chamber and the enlarged diameter section of said first pipe.

References Cited

UNITED STATES PATENTS

| | | | |
|---|---|---|---|
| 915,502 | 3/1909 | Struer | 285—302 |
| 1,872,089 | 8/1932 | McKee | 285—302 |
| 2,308,757 | 1/1943 | Hulsberg | 285—114 X |
| 2,373,280 | 4/1945 | Weber | 285—302 |

FOREIGN PATENTS

| | | |
|---|---|---|
| 901,608 | 1/1954 | Germany. |
| 996,228 | 6/1965 | Great Britain. |
| 285,088 | 5/1949 | Switzerland. |

THOMAS F. CALLAGHAN, Primary Examiner

U.S. Cl. X.R.

285—114, 302